Sept. 20, 1927.  G. WEISS ET AL  1,642,981
PIPE JOINT
Filed Feb. 7, 1924    3 Sheets-Sheet 2
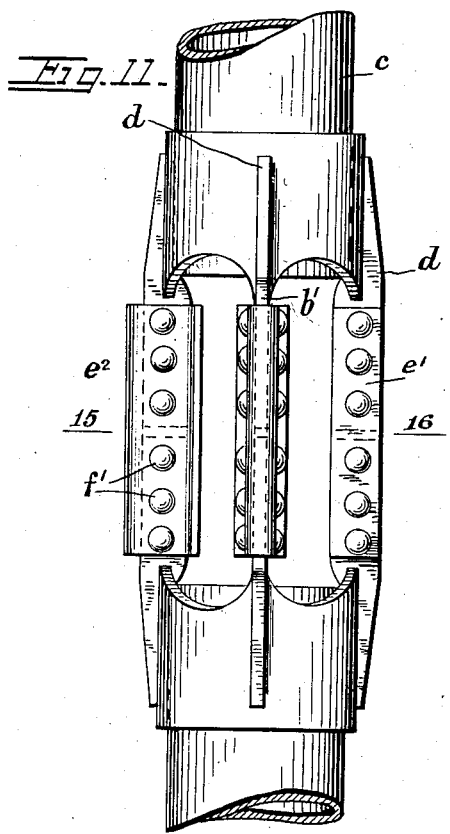
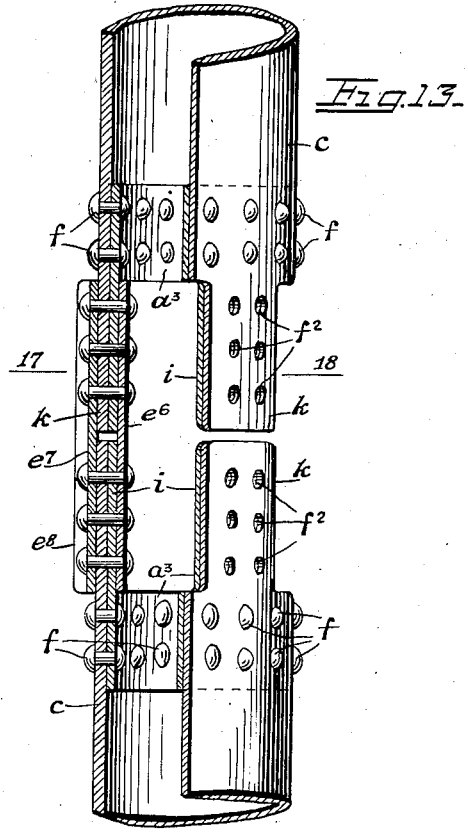
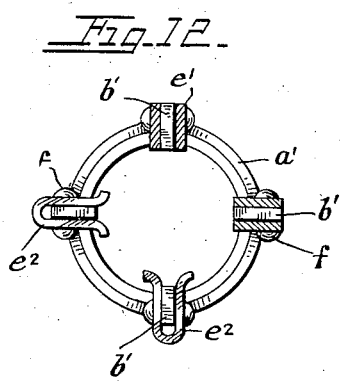
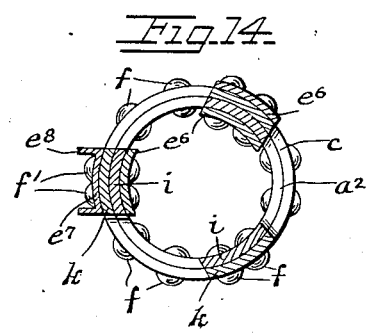
Inventors.
Fritz Gentzcke
AND George Weiss

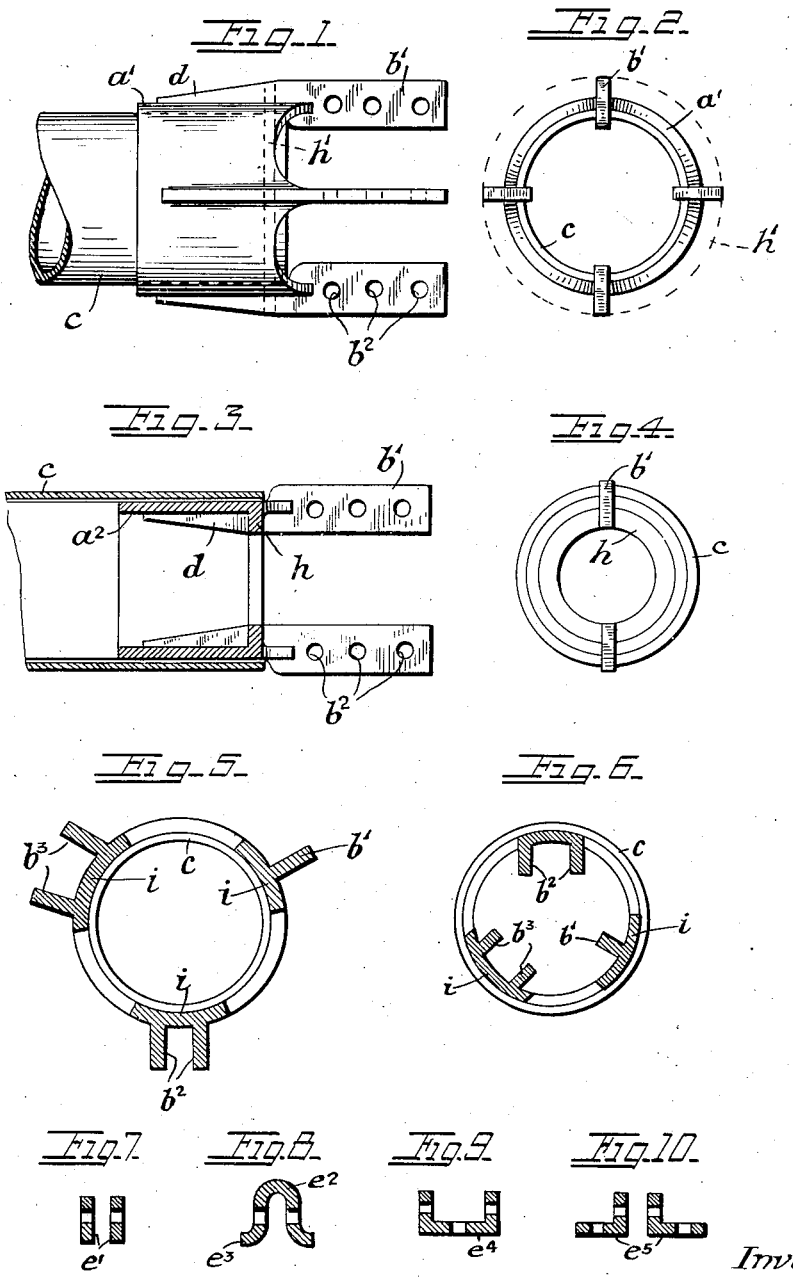

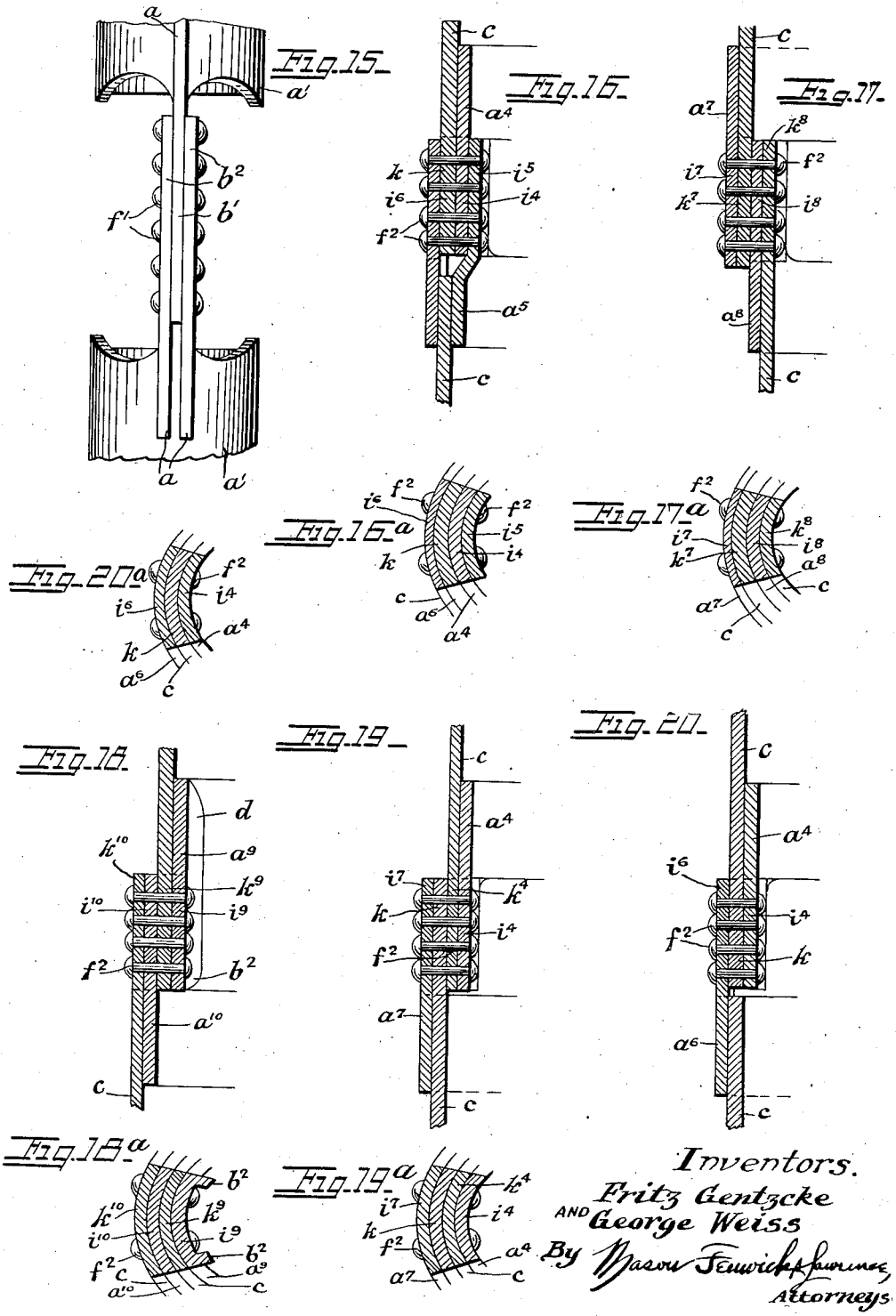

Patented Sept. 20, 1927.

1,642,981

UNITED STATES PATENT OFFICE.

GEORG WEISS AND FRITZ GENTZCKE, OF ZEESEN, NEAR KONIGSWUSTERHAUSEN, GERMANY, ASSIGNORS TO SCHUETTE-LANG LUFTFAHRZEUGBAU- UND BETRIEBS- G. M. B. H., OF ZEESEN, NEAR KONIGSWUSTERHAUSEN, GERMANY.

PIPE JOINT.

Application filed February 7, 1924, Serial No. 691,318, and in Germany February 10, 1923.

This invention relates to improved pipe joints, such as are employed in connecting the butt-ends of pipes for use, for example, in the construction of frames skeletons and similar structures, in particular of skeletons or frame works for airships. In structures of this kind the pipes must be of considerable length and often require to be composed of single sections which are to be connected with each other by means of rivets, it being objectionable, for the particular purposes, to connect such pipe sections by welding or by means of threaded coupling sleeves or the like.

It has been suggested to unite the butt-ends of two pipe sections by means of an inner or an outer sleeve and to connect the sleeve with the pipe ends by riveting. Furthermore it has been proposed to employ for the purpose a pair of half-sleeves of shells. But in all these cases the riveting operation cannot be readily carried out and auxiliary holes in the wall of the pipes are required to get access to the rivet heads during riveting. Moreover the application of coupling sleeves of the stated kind is not possible or only possible with great difficulties in cases where a pipe section is to be inserted between the ends of two stationary pipes or pipe sections.

All these difficulties are overcome by the present invention and at the same time a further advantage is ensured by the new joint residing in that the two pipes or pipe sections to be coupled assume a correct coaxial position towards each other by themselves during the connecting operation and differences or inaccuracies in the length of the sections are equalized by the joint or do not interfere with the proper application of the joint. A further object of the invention is to provide a readily applicable, strong and reliable connection between the pipes or pipe sections to be coupled together.

With the above object in view the improved new joint comprises two sleeves having each a plurality of longitudinal extensions or lugs which extend in the direction to the other of the two pipes that are to be connected with each other, the arrangement of the two pipes relatively to one another being such that the end faces of said extensions or lugs abut, or nearly abut, with each other; a small gap may be left therebetween.

The aligned extensions or lugs are connected with each other by straps, preferably pairs of straps, and by rivets connecting the said lugs and the straps with each other.

In a particular modification of the invention the straps are replaced by lugs, that is to say, by pairs of lugs projecting forth from the sleeve of one of the pipes to be jointed and receiving between them a single lug projecting forth from the opposite sleeve which pertains to the other of the two pipes, each of these three lugs being practically as long as a strap of the kind mentioned in the preceding paragraph. The three lugs are connected with each other also by rivets, whereby the tubes, the sleeves and the lugs are turned into a rigid structure.

The sleeves are welded or riveted to the tube-ends, or otherwise fixed thereto and may be applied inside or outside of the tubes.

Several embodiments of this improved joint are illustrated, by way of example, in the accompanying drawings, in which Figure 1 is a side-view of one pipe-end and of the appertaining sleeve with its lugs attached thereto; Figure 2 is an end-view of these parts; Figure 3 is an illustration similar to Figure 1, showing, however, a modification, the sleeve being located inside the tube, or tube-end respectively, and both parts being shown in longitudinal section; Figure 4 is an end-view of the parts shown in Figure 3; Figure 5 is an illustration similar to Figure 2 showing three modifications as regards the arrangement of the lugs relatively to the sleeve and the tube, the lugs and some adjacent parts being shown in cross-section; Figure 6 is an illustration similar to Figure 4 showing also three modifications as regards the arrangement of the lugs relatively to the sleeve and the tube, also these lugs and some adjacent parts being shown in cross-section; Figures 7, 8, 9, and 10, relate to the straps connecting the sleeve-lugs with each other, and show cross-section of four forms, as more fully described hereinafter; Figure 11 is a side-view of a finished joint of the kind illustrated in Figures 1 and 2; Figure 12 is a cross-section in the plane 15—16 of Figure 11; Figure 13 is an illustration similar to Figure 11, but showing a modification and the left hand half of the figure being shown in longitudinal section;

and Figure 14 is a cross-section in the plane 17—18 of Figure 13; Figure 15 is an illustration similar to the middle part of Figure 11 and shows also modification. Figures 16, 17, 18, 19 and 20, are illustrations similar to the left hand half of Figure 13 and show five further modifications, and Figures 16$^a$, 17$^a$, 18$^a$, 19$^a$, and 20$^a$, are cross-sections corresponding to said latter five modifications, the plane of section passing through the parts connected by the rivets.

Referring to Figures 1 and 2, $c$ denotes the tube or tube-end, i. e. one of the two tubes or tube-ends which are to be connected with each other by our improved joint. The parts forming the joint proper are the same for both tube-ends; they consist, at each end thereof, of a sleeve $a^1$ having a plurality of longitudinal extensions or lugs $b^1$, of which there are four in the example shown in Figures 1 and 2. We wish it, however, to be understood that there may be less than four lugs, for instance three or at least two (as is the case, for instance, in the modification shown in Figures 3 and 4 dealt with hereinafter), or more than four, although this will occur only rarely in the practical employment of the invention. The sleeve and the lugs are connected with each other also by ribs $d$ which extend from the lugs to nearly the other end of the sleeve. In radial direction the lugs extend partly inwards beyond the inner diameter of the tube $c$ whereby the outer diameter of the joint is diminished.

Each lug $b^1$ is provided with a plurality of holes $b^2$, of which there are three in each lug in the example in question (Fig. 1). Two aligned lugs are connected with each other by means of a choice of straps, and by means of rivets $f^1$ (Figs. 11 and 12) connecting all these parts with each other $f^2$ (Fig. 13) are holes intended to receive the rivets.

Thus the two straps pertaining to one lug may be separate members, as shown in Figure 7 and at the top and right hand part of Figure 12, but if desired or preferred they may be integral U-shaped members as shown at $e^2$ in Fig. 8 and in the lower part and the left hand part of Figure 12, as well as in the left hand part of Figure 11. This is a double strap forming a groove or channel receiving the appertaining two sleeve extensions or lugs. The free rims or edges are bent outwards to form flanges as shown at $e^3$. These flanges may, however, be dispensed with, or separate straps, as $e^1$, Fig. 7, may be provided with flanges at one of, or both, their rims or edges, as will be clear without separate illustrations.

It is not indispensably requisite that the sleeve lugs extend radially inwards in the manner illustrated in Figs. 1 and 2. They may lie completely at the outer circumference of the sleeve, as shown in Figure 5 in three examples. There is in this figure a single lug $b^1$ which corresponds practically to any of the lugs $b^1$ of Figures 1 and 2, except that the lug is combined with a foot or flange $i$ forming an extension of the sleeve $a^1$. The lugs may be provided in pairs, as shown at $b^2$ and $b^3$ which differ from each other by the width of the groove between them, and the two parallel lugs being connected with each other by a common foot or extension $i$. To connect such and similar forms with each other, straps of the kind shown in Figures 9 and 10 are employed. The strap $e^4$, Fig. 9 is U-shaped in section, whereas Fig. 10 shows two separate straps $e^5$ of angular section. It is obvious that also other forms of straps may be used, always as fitting best to the shape, arrangement, and number of the sleeve-extensions or lugs.

While in Figures 1, 2, and 5, the sleeve is located outside the tube, Figures 3, 4 and 6 show a modification in which it is located inside the same. This sleeve $a^2$ is provided with extensions or lugs $b^1$ and with ribs $d$ exactly as in Figs. 1 and 2, but there is provided also an internal flange $h$ forming an additional stiffening or reinforcing means. There are in this case only two lugs $b^1$, but it is obvious that three or more may be employed instead of the two.

While in Fig. 5 the single or double lugs are located entirely at the outer circumference of the sleeve which is an outer one like that of Figs. 1 and 2, Figure 6 shows modifications in which the single or double lugs are arranged entirely at the inner circumference of the sleeve which is an internal one in this case. All which has been said with respect to Figure 5 and to the straps used in connection with its lugs applies also to Figure 6, by reason whereof we abstain from entering into details concerning this figure (6). We only mention that similar letters of reference denote similar parts.

Referring now to Figures 13 and 14 they are distinguished from Figures 1-6, 11 and 12 in various respects. The sleeve $a^3$ being designed as an inner one has longitudinal extensions $i$ resembling the extensions $i$ minus the radial lugs of Figs. 5 and 6. Similar parallel extensions $k$ are provided at the tube $c$. The extensions $i$ and $k$ are connected with each other, as well as with pairs of straps $e^6$ $e^6$ (Fig. 14, upper part of right hand half) or $e^6$ $e^7$ (Fig. 14, left hand part), by means of rivets $f^1$. The straps $e^7$ are distinguished from the straps $e^6$ by their flanges $e^8$ which increase the rigidity of the structure. There may be employed only straps $e^6$ or only straps $e^7$ $e^8$, or the inner straps may be of the kind $e^6$, and the outer ones of the kind $e^7$ $e^8$, as desired or preferred in the given case.

It will be observed that there are in Figs. 13 and 14 no sleeve extensions or lugs which extend, besides longitudinally, also radially, as the extensions or lugs $b^1$ and $b^2$ or $b^3$ of Figs. 1–5; in fact, the extensions of any of these forms may be not only reduced in height, as regards their radial direction, but they can be entirely dispensed with if an equivalent substitute is provided, as is formed, for instance, by the extensions or lugs $k$ (Figs. 13 and 14) of the tube $c$.

The dotted lines $h^1$ in Fig. 1 and the dotted line $h^1$ in Fig. 2 are intended to indicate that the four members $d\ b^1$ may be connected with each other by an outer flange $h^1$ which is, obviously, an equivalent for the inner flange $h$ of Figs. 3 and 4. Also other changes of minor importance may be made without departing from the invention. At any rate we wish it to be understood that we do not desire to be limited to the exact details of construction shown and described, for obvious modifications will occur to a person skilled in the art.

Figure 15 relates to that modification mentioned in the introductory part of the specification in which pairs of lugs are employed instead of the straps. We have illustrated only one such arrangement and combination of parts in Figure 15, it being understood that the complete joint consists of a plurality thereof, say three or four. The upper lug $b^1$ is practically such a one as $b^1$ in Figure 11 and extend nearly to the lower sleeve. This latter is provided with pairs of lugs $b^2$ (practically as in the lower part of Figure 5) which are so spaced as to be adapted to receive the single lugs $b^1$ between them. Also these lugs $b^2$ are long and extend nearly to the upper sleeve, as shown. The lugs $b^1$ and $b^2$ are connected with each other by rivets $f^1$.

The lug $b^1$ may have a flange or foot like $i$ in the right hand upper part of Figure 5, or the lugs $b^2$ may be connected with each other or made integral like $b^2\ i$ in the lower part of Figure 5, the foot or the connecting member serving as a support for the other lug or lugs, as will be evident without further entering into details.

While the principle embodied in Figure 15 is applied in this figure to such forms of the pipe-joint as are illustrated in Figures 1, 5, 11, and 12, that is to say, to joints in which the lugs of the sleeves (the tubes themselves having no lugs) resemble longitudinal ribs, the modifications illustrated in Figures 16–20ª show that and how the same principle can be applied to joints of the kind illustrated in Figures 13 and 14 in which the lugs, namely lugs of the sleeves, as well as of the tubes themselves, extend in the direction of the tube-walls.

In Figures 13 and 14 the two tubes have equal diameter, as is the case also in the modifications shown in Figs. 16 and 20. Also the sleeves of Figs. 13 and 14 have equal diameter, which is at least partly the case also in Figure 16, as regards the two inner sleeves $a^4$ and $a^5$, of which, however, the sleeve $a^5$ which pertains to the lower tube $c$ is contracted in its upper part $i^5$, but this part is, in fact divided into lugs, as is also the part $i^6$ of the outer sleeve $a^6$ of the lower tube $c$. The lugs $i^5$ and $i^6$ are located opposite to one another, or form pairs respectively, and between each pair is located another pair of lugs, viz lugs $k$ of the upper tube $c$ and lugs $i^4$ of the sleeve $a^4$ which latter pertains to the upper tube and is arranged inside the same. The sets or groups of four lugs are rigidly connected with each other by the rivets $f^2$, just as in Figs. 13 and 14, and there are also in this case preferably at least three or, maybe, four such sets which, in combination with the sleeves, form the joint.

Figures 16 and 16ª show the only example in which there are three sleeves. In the other modifications (Figs. 17–20ª) there are only two, as in Figs. 11–14, but there is this difference with respect to Figs. 11–14 that the sleeves are of unequal diameters.

In Figures 17 and 17ª each tube is provided with an outer sleeve. $a^7$ is the sleeve of the upper tube, and $a^8$ that of the lower tube. The lugs $k^7$ of the upper tube are located between the lugs $i^7$ of the sleeve $a^7$ and the lugs $l^8$ of the sleeve $a^8$, and these latter lugs are located between the lugs $k^7$ already mentioned and the lugs $k^8$ of the lower tube. The several sets of lugs are again connected with each other by the rivets $f^2$.

This is the case also in Figures 18, 18ª, 19, 19ª, 20 and 20ª, which hardly require a detailed description as the differences between them and Figs. 16–17ª, as well as between themselves, are at once obvious to the eye. Mention may be made only of the features that as regards Figs. 18 and 18ª the two sleeves are situated inside the tubes, and that as regards Figs. 19–20ª there is an inner sleeve and an outer one, and that as regards Figs. 20 and 20ª only one of the tubes is provided with lugs, which are the lugs $k$ of the upper tube, whereas the lower tube has no lugs at all just as the tubes of Figures 1–6.

We claim:

1. A pipe-joint, comprising, in combination, two sleeves, of which one is affixed to one, the other to the other of the two pipes to be jointed; lugs extending forth from both said sleeves towards each other and being each arranged in alignment with the lugs of the opposite sleeve; straps extending along the combined lengths of said lugs, and means for connecting the latter and said straps with each other.

2. A pipe joint, comprising, in combination, two co-axial sleeves, of which one is secured to one of the two pipes to be jointed, the other to the other thereof; lugs extending forth from each of said sleeves towards the other one and being arranged in alignment with the lugs thereof; straps arranged parallelly to said lugs, and being riveted together therewith.

3. A pipe-joint, comprising, in combination, two aligned sleeves attached to the opposite ends of the pipes to be jointed; a plurality of lugs extending forth from each sleeve towards the other sleeve and being arranged in alignment with the same; pairs of straps arranged parallelly to said lugs so as to enclose them, and means for connecting the lugs and the straps with each other, as set forth.

4. A pipe-joint, comprising, in combination, two sleeves affixed firmly to the opposite ends of the two pipes to be jointed; a plurality of uniformly spaced lugs extending forth from each sleeve in the direction of the other sleeve and being arranged in alignment with the same, and being each provided with a plurality of holes; pairs of straps arranged parallelly to said lugs along the combined lengths thereof and having the appertaining lugs lying between the two members of each pair, and having each a plurality of holes positioned according to the lug-holes; and rivets located in said holes and connecting the lugs and the straps undetachably with each other, substantially as set forth.

5. A pipe-joint, comprising, in combination, two sleeves affixed to the ends of the two pipes to be jointed; lugs extending forth from each sleeve towards the other one; lugs extending forth from the ends of said pipes and being located just over the sleeve-lugs; straps arranged on the inner face of the sleeve-lugs, and straps arranged on the outer face of the pipe-lugs, and means connecting the superposed lugs and straps with each other, as set forth.

6. A pipe-joint comprising in combination, two sleeves, one of which is affixed to one, and the other to the other of two pipes to be jointed; lugs extending forth from both of said sleeves toward each other, and means for rigidly securing the lugs with respect to each other.

GEORG WEISS.
FRITZ GENTZCKE.